(12) United States Patent
Zeng et al.

(10) Patent No.: US 12,026,134 B2
(45) Date of Patent: Jul. 2, 2024

(54) FLOW-BASED DATA QUALITY MONITORING

(71) Applicant: Microsoft Technology Licensing, LLC, Redmond, WA (US)

(72) Inventors: Liangzhao Zeng, Cupertino, CA (US); Ting Yu Cliff Leung, San Jose, CA (US); Xiaoyang Gao, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 151 days.

(21) Appl. No.: 17/664,655

(22) Filed: May 23, 2022

(65) Prior Publication Data

US 2023/0376469 A1    Nov. 23, 2023

(51) Int. Cl.
  *G06F 16/215*    (2019.01)
  *G06F 16/2455*   (2019.01)
(52) U.S. Cl.
  CPC ........ *G06F 16/215* (2019.01); *G06F 16/2455* (2019.01)
(58) Field of Classification Search
  CPC . G06F 11/3072; G06F 11/0793; G06F 16/215
  USPC .......................................................... 707/705
  See application file for complete search history.

(56) References Cited

U.S. PATENT DOCUMENTS

| | | | | |
|---|---|---|---|---|
| 9,720,746 B2 * | 8/2017 | Zhu | ......................... | H04L 67/60 |
| 10,984,128 B1 | 4/2021 | Hoffer | | |
| 11,204,851 B1 * | 12/2021 | Iyengar | ............... | G06F 11/0793 |
| 11,765,249 B2 * | 9/2023 | Erlingsson | ............ | G06F 21/577 |
| | | | | 709/224 |
| 2002/0046072 A1 * | 4/2002 | Arai | .................... | G06Q 10/0633 |
| | | | | 702/182 |
| 2007/0067373 A1 * | 3/2007 | Higgins | .................. | G06Q 30/00 |
| 2007/0150329 A1 * | 6/2007 | Brook | ............ | G06Q 10/063112 |
| | | | | 705/7.41 |
| 2009/0172669 A1 * | 7/2009 | Bobak | .................... | G06Q 10/06 |
| | | | | 718/100 |
| 2010/0125450 A1 * | 5/2010 | Michaelangelo | ..... | G06F 40/232 |
| | | | | 704/235 |
| 2011/0082712 A1 | 4/2011 | Eberhardt et al. | | |

(Continued)

OTHER PUBLICATIONS

"Notice of Allowance Issued in U.S. Appl. No. 17/454,229", Mailed Date: Oct. 17, 2023, 5 Pages.

(Continued)

*Primary Examiner* — Hanh B Thai
(74) *Attorney, Agent, or Firm* — Nicholson De Vos Webster & Elliott LLP (57) ABSTRACT

Embodiments of the system in includes data set analytics to identify one or more dataset utilized by a workflow. The data set analytics identifies upstream data sets referenced by the data sets utilized by the workflow. The set of all data sets relevant to the workflow are considered applicable data sets, and are analyzed. The data set analytics determines a usage pattern of each of the applicable data sets by the workflow, and identifies one or more data quality assertions for each of the applicable of data sets based on the usage pattern. The data set analytics further perform a quality evaluation of the applicable data sets by applying data quality assertions to the applicable data sets used by the workflow.

20 Claims, 8 Drawing Sheets

(56) References Cited

U.S. PATENT DOCUMENTS

| | | | |
|---|---|---|---|
| 2012/0192143 A1* | 7/2012 | Elaasar | G06F 8/35 |
| | | | 717/104 |
| 2017/0017705 A1* | 1/2017 | Nelke | G06F 16/254 |
| 2017/0046484 A1 | 2/2017 | Buckler et al. | |
| 2017/0264634 A1* | 9/2017 | Carter | H04L 63/102 |
| 2019/0026634 A1* | 1/2019 | Homeyer | G06N 20/00 |
| 2019/0026663 A1* | 1/2019 | Homeyer | G06Q 10/0633 |
| 2019/0318283 A1* | 10/2019 | Kelly | G06Q 10/1095 |
| 2020/0125448 A1* | 4/2020 | von Trapp | G06F 11/0793 |
| 2020/0210391 A1* | 7/2020 | Scott | G06F 16/254 |
| 2021/0064645 A1* | 3/2021 | Ferreira | G06F 16/367 |
| 2021/0248144 A1* | 8/2021 | Haile | H04L 43/16 |
| 2021/0397522 A1* | 12/2021 | Owen | G06F 16/128 |
| 2022/0043826 A1* | 2/2022 | Zorin | G06F 16/24573 |
| 2022/0108262 A1* | 4/2022 | Cella | G06Q 10/063118 |
| 2022/0228102 A1 | 7/2022 | Le et al. | |
| 2023/0075355 A1* | 3/2023 | Twigg | H04L 67/306 |
| 2023/0145069 A1 | 5/2023 | Zeng et al. | |
| 2023/0147939 A1 | 5/2023 | Zeng et al. | |
| 2023/0206181 A1* | 6/2023 | Stone | G06Q 10/103 |
| | | | 705/7.14 |

OTHER PUBLICATIONS

"Notice of Allowance Issued in U.S. Appl. No. 17/454,229", Mailed Date: Jul. 28, 2023, 14 Pages.

Xenonstack, "Data Ingestion, Processing and Big Data Architecture Layers", In Publication of Digital Transformation and Platform Engineering Insights, Mar. 2, 2017, pp. 1-28.

"Non Final Office Action Issued in U.S. Appl. No. 17/454,232", Mailed Date: Sep. 28, 2023, 11 Pages.

Zeng, et al., "Towards Data Quality Management at LinkedIn", Retrieved from: https://engineering.linkedin.com/blog/2022/towards-data-quality-management-at-linkedin, Jun. 9, 2022, 5 Pages.

"Non-Final Office Action Issued in U.S. Appl. No. 17/454,229", Mailed Date: Mar. 16, 2023, 16 Pages.

U.S. Appl. No. 17/454,229, filed Nov. 9, 2021.

U.S. Appl. No. 17/454,232, filed Nov. 9, 2011.

Notice of Allowance mailed on Dec. 26, 2023, in U.S. Appl. No. 17/454,232, 10 pages.

Notice of Allowance mailed on Mar. 6, 2024, in U.S. Appl. No. 17/454,232, 10 pages.

Supplemental Notice of Allowance mailed on Jan. 4, 2024, in U.S. Appl. No. 17/454,232, 3 Pages.

\* cited by examiner

FLOW-BASED DATA QUALITY MONITORING

TECHNICAL FIELD

The present disclosure generally relates to data health, and more specifically, relates to flow-based data quality monitoring.

BACKGROUND

Data health can refer to the status and/or quality of data stored in a data store, or data storage system. Data health management can refer to software tools for managing data health in the data store.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

In other systems, data quality management is accomplished using low level programming, which requires information technology (IT) and programming skills to implement. Other approaches may provide some text description about data quality, but do not enable any enforcement of data quality standards.

Aspects of the present disclosure are directed to automatic data quality monitoring. In other systems, rules to validate data quality and triggered alerts are hand coded. Hand coding these rules and triggers requires IT and programming skills. In a system that includes workflows that utilize heterogeneous data from a large number of sources, the hand coding of rules and triggers can quickly become unmanageable.

In some alternative approaches, text descriptions of data quality requirements are provided to external data providers, and the external data providers are required to adhere to the data quality requirements expressed in those text descriptions. In a larger system that has a significant number of data providers, the task of ensuring that each data provider has correctly interpreted the text descriptions and is adhering to its respective data quality requirements is very challenging and time consuming to manage.

Aspects of the present disclosure address the above and other deficiencies by providing a system for automatic flow-based data quality monitoring, which derives data metrics relevant to a workflow automatically from analyzing the use of data sets by the workflow, and automatically creates rules to validate the data sets. A collection of data received from a data source is referred to as a data set. A data set shares the same characteristics, or data characteristics. A data set consists of multiple data batches, received over time. A data batch is a data partition or data version. The workflow is a process implementing a sequence of data processing steps. Each of the processing stages will utilize some input data and produce some output data. The input data may include data from one or more data sets. Workflows can be used to generate recommendations, other content, or additional data. For example, in an online network application, a workflow may utilize information about a particular user which includes data from various data sets, to generate a potential job listing. The workflow may utilize job listings, the user's past jobs, the user's connections, and other information to target the user with a relevant listing.

The system analyzes the use of the data sets by a particular workflow. Data quality metrics are the measured characteristics of the data sets as used by the workflow, which include specific characteristics required by workflows, which may include for example use frequency, creation time, data batch count, data schema, and other characteristics of the data sets as used by the particular workflow. The data quality assertions are the characteristics that are expected to be met by the data batches of a particular data set for the workflow. A single data set in the metadata repository may have a number of different data quality assertions, based on the usage pattern of the data set by various workflows.

The system in one embodiment includes alerts to workflows using the data, when one or more of the data quality assertions are not met. In some embodiments, the failure of the data quality assertion can trigger automatic actions, such as the exclusion of a data set from a particular workflow, or the use of an alternate data set, or the use of the data set that failed a data quality assertion and an alert. The disclosed technologies in one embodiment further provide the ability to customize the data quality assertions, and responses to failure, such that users receive relevant notifications when one or more of the data quality assertions are not met by data that their workflow uses.

The present system is designed to handle workflows which utilize a large number of data sets and data volume of terabytes of data. The system is designed to include workflows which incorporate new data sets from new sources periodically, or change what portions of data sets they use. The new data sets may not have a known set of characteristics. The ability of the system to derive the data quality assertions from the observed data use by the workflows enables handling of large scale data, and heterogenous data sets. In one embodiment, the present system is utilized with a data store that has exabytes of data from hundreds of different data sources, and billions of events per hour. Traditional systems that require setting up and verifying assertions on a per data set basis cannot handle this type of volume. However, the present system is capable of addressing workflows that utilize such data streams in a scalable way. Furthermore, the present system ensures that any alerts sent when a data set fails the data quality assertions is relevant to the user whose workflow the alert is associated with.

Figure 1:
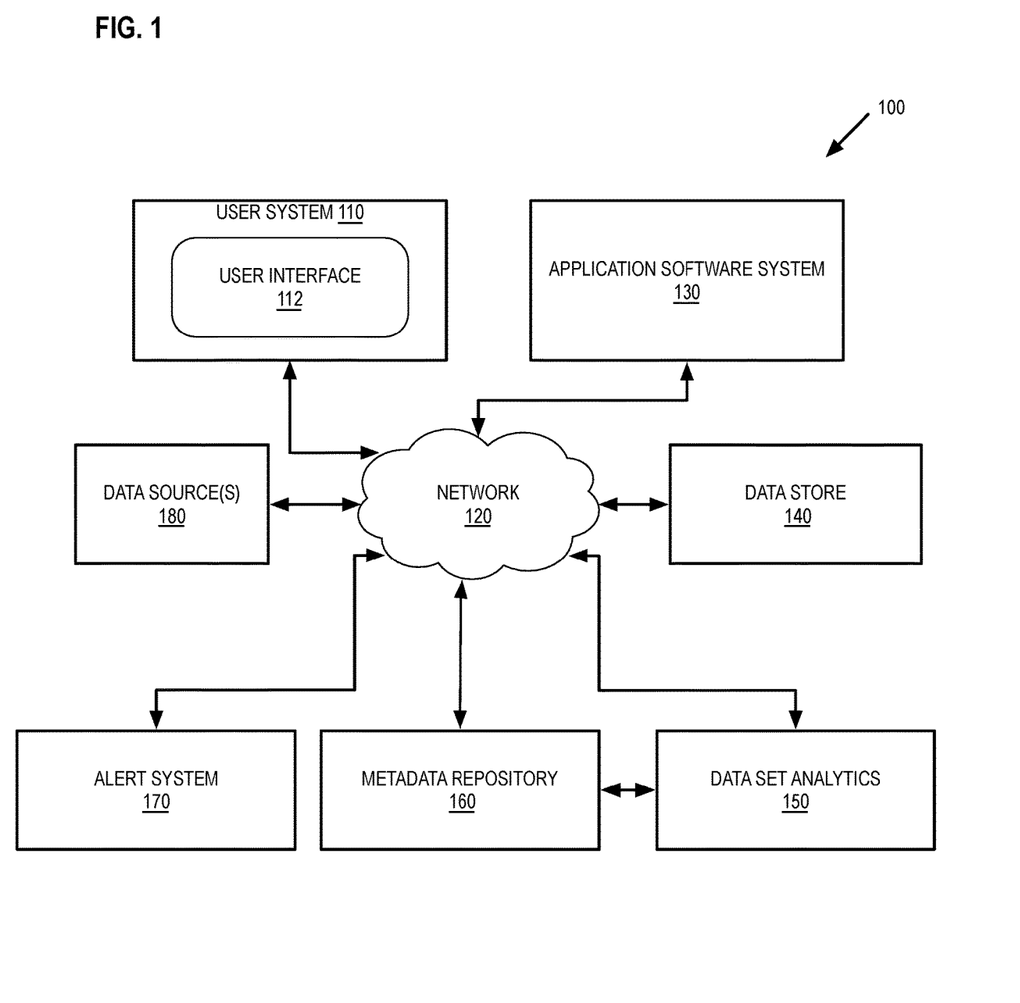
FIG. 1 illustrates an example computing system 100 that includes data set analytics 150 in accordance with some embodiments of the present disclosure.

FIG. 1 illustrates an example computing system 100 that includes a data set analytics system 150 in accordance with some embodiments of the present disclosure.

In the embodiment of FIG. 1, computing system 100 includes a user system 110, a network 120, an application software system 130, a data store 140, a data set analytics system 150, and a metadata repository 160.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 can be or include a front-end portion of application software system 130. For simplicity, the present application will use as an example an online network application system. Online network application systems include but are not limited to connections network software, such as professional and/or general social media platforms, and systems that are or are not based on connections network software, such as digital content distribution services, general-purpose search engines, job search software, recruiter search software, sales assistance software, advertising software, learning and education software, or any combination of any of the foregoing. However, the present system can be used with any application that utilizes large data sets.

User interface 112 is any type of user interface as described above. User interface 112 can be used to input search queries and view or otherwise perceive output that includes data produced by application software system 130. For example, user interface 112 can include a graphical user interface and/or a conversational voice/speech interface that includes a mechanism for entering a search query and viewing query results and/or other digital content. Examples of user interface 112 include web browsers, command line interfaces, and mobile apps. User interface 112 as used herein can include application programming interfaces (APIs).

Data store 140 stores a plurality of heterogeneous data sets, each data set including a plurality of data batches. The data sets, in one embodiment, includes data received from external data sources 180. The data sets, in one embodiment, include data from internal data sources. Heterogeneous data sets include data sets that have different content, schemas, delivery frequencies, and times, and/or other differentiators. The data sets can be from different providers, e.g., internally created by various groups and/or received various third parties.

The data may be received from heterogeneous data sources 180, which include different systems. These systems can be within the same company or may be external to the company. In some embodiments, the systems generating the data may be running on the same computing system 100.

In the online network application system example provided, the heterogeneous data sources 180 for example can include data sources of information about user connections, data sources of information indicating user posts on the online network application, and data sources that collect user interactions on third party websites, such as media sites that are affiliated with the online network application system. Some of these data sets are generated by the online network application. The data sets provided as examples are heterogeneous because they are provided on a different schedule, for different data, with different data schemas. However, any one of those differentiators is sufficient to consider data sets heterogenous.

In one embodiment, there can be different heterogeneous data sources 180 which provide different types, quantities, and frequencies of data to the data store 140. Data store 140 can reside on at least one persistent and/or volatile storage device that can reside within the same local network as at least one other device of computing system 100 and/or in a network that is remote relative to at least one other device of computing system 100. Thus, although depicted as being included in computing system 100, portions of data store 140 can be part of computing system 100 or accessed by computing system 100 over a network, such as network 120.

Application software system 130 is any type of application software system that includes or utilizes functionality provided by the data set analytics 150. Examples of application software system 130 include but are not limited to connections network software, such as social media platforms, and systems that are or are not based on connections network software, such as general-purpose search engines, job search software, recruiter search software, sales assistance software, advertising software, learning and education software, or any combination of any of the foregoing. The application software system 130 can include a system that provides data to network software such as social media platforms or systems. The application software system 130 may initiate a workflow, which is a process that utilizes one or more data sets from a data store 140. The workflow may be for example, to generate recommendations, advertising, or other content. This content may be for display to users or for another purpose.

Alert system 170 in one embodiment provides an alert to a user interface 112, when one or more data sets used by a workflow fail the associated data quality assertions, as determined by data set analytics 150.

While not specifically shown, it should be understood that any of user system 110, application software system 130, data store 140, data set analytics 150, metadata repository 160, and alert system 170 includes an interface embodied as computer programming code stored in computer memory that when executed causes a computing device to enable bidirectional communication with any other of user system 110, application software system 130, data store 140, data set analytics 150 and metadata repository 160 using a communicative coupling mechanism. Examples of communicative coupling mechanisms include network interfaces, inter-process communication (IPC) interfaces and application program interfaces (APIs).

A client portion of application software system 130 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running application software system 130 and/or a server portion of application software system 130 can receive the input, perform at least one operation using the input, and return output using an HTTP response that the web browser receives and processes.

Each of user system 110, application software system 130, data store 140, data set analytics 150, metadata repository 160, and alert system 170 is implemented using at least one computing device that is communicatively coupled to electronic communications network 120. Any of user system 110, application software system 130, data store 140, data set analytics 150, metadata repository 160, and alert system 170 can be bidirectionally communicatively coupled by network 120, in some embodiments. User system 110 as well as one or more different user systems (not shown) can be bidirectionally communicatively coupled to application software system 130.

A typical user of user system 110 can be an administrator or end user of application software system 130, data set analytics 150, metadata repository 160, and alert system 170. User system 110 is configured to communicate bidirectionally with any of application software system 130, data store 140, data set analytics 150, metadata repository 160, and alert system 170 over network 120, in one embodiment. In another embodiment, the user system 110 communicates with application software system 130, and data set analytics 150, and alert system 170 but does not directly communicate with the metadata repository 160.

The features and functionality of user system 110, application software system 130, data store 140, data set analytics 150, metadata repository 160, and alert system 170 are implemented using computer software, hardware, or software and hardware, and can include combinations of automated functionality, data structures, and digital data, which are represented schematically in the figures. User system 110, application software system 130, data store 140, data set analytics 150, metadata repository 160, and alert system 170 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links, as well as wired networks, or computer busses when the system 100 is implemented on a single computer system. The various elements can be connected with different networks and/or types of networks.

Figure 8:
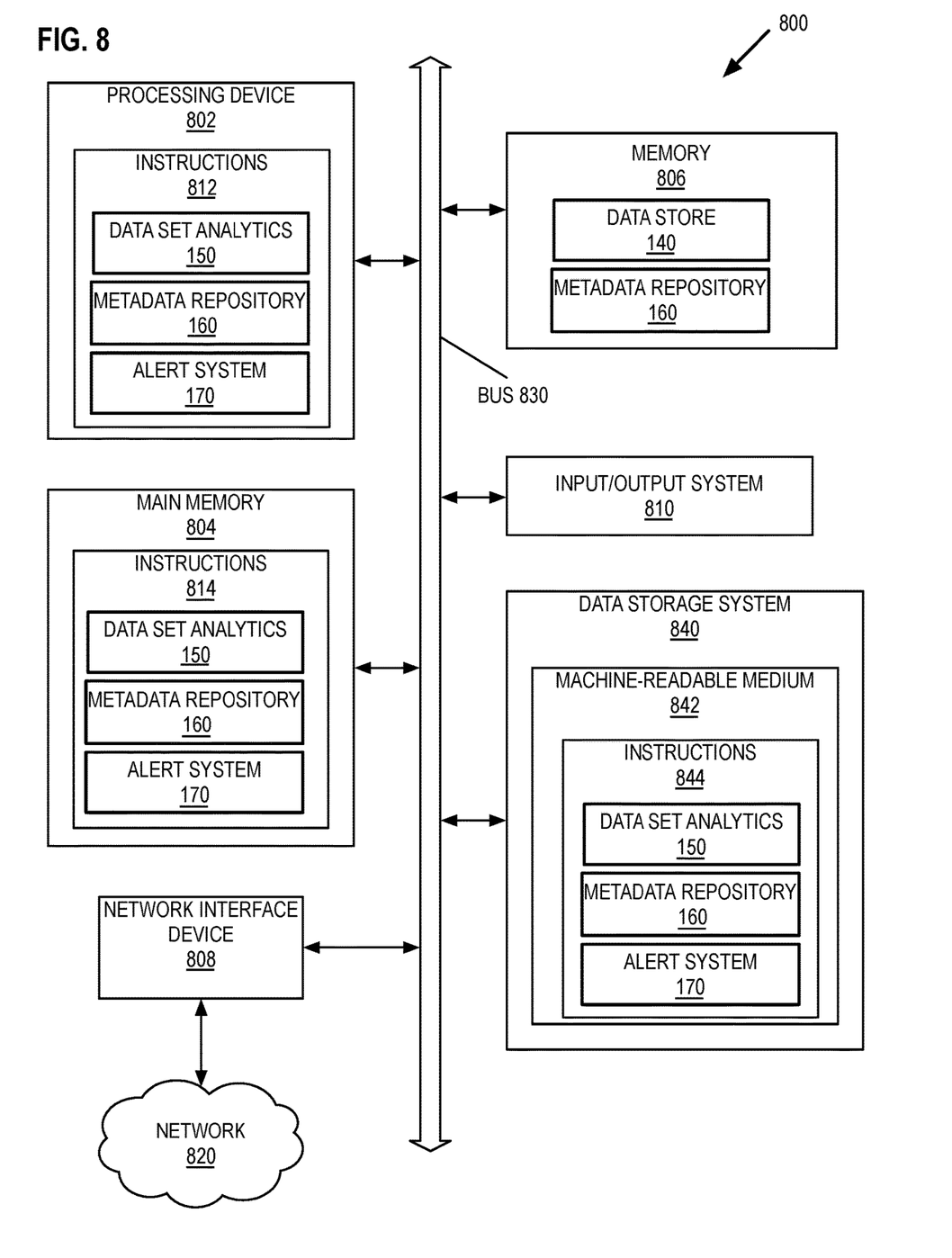
FIG. 8 is a block diagram of an example computer system in which embodiments of the present disclosure can operate.

The computing system 110 includes a data set analytics component 150 that can evaluate the data quality of data in the data store 140, received from data sources 180, a metadata repository 160 which can be queried by user systems 110 associated with data consumers, and an alert system 170 to alert action when data quality metrics fail. In some embodiments, the application software system 130 includes at least a portion of the data set analytics 150. As shown in FIG. 8, the data set analytics 150 can be implemented as instructions stored in a memory, and a processing device 802 can be configured to execute the instructions stored in the memory to perform the operations described herein.

The data set analytics 150 can automatically create data validation assertions for workflows using one or more heterogeneous data sets, and apply those data validation assertions to verify the data quality of data sets in the data store 140, for the particular workflow.

The metadata repository 160 stores this metadata about the data sets. The disclosed technologies can be described with reference to the large number of types of data utilized in a social graph application such as a professional online network application. The disclosed technologies are not limited to data associated with social graph applications but can be used to perform data quality validation more generally. The disclosed technologies can be used by many different types of network-based applications which consume large heterogeneous data sets. For example, any predictive system which receives large volumes of different types of data which change over time, could take advantage of such a system. The metadata repository 160 in one embodiment stores the metadata generated by the data set analytics 150. The alert system 170 takes the preset actions when one or more of the data sets used in a workflow fail the established data quality metrics. In one embodiment, the alert system 170 provides a notification to the data consumer. The data consumer may address the alert in various ways including discontinuing the workflow, utilizing a different data set, or permitting the available data sets which failed the data quality metrics to be used. In one embodiment, the alert system 170 may exclude the new batch of data. In one embodiment, a prior data batch that met the data quality metrics is substituted to the workflow. In one embodiment, the new data may be used, even though there are failures. In another embodiment, the workflow may be stopped. In one embodiment, the remedial action taken may be set by the workflow owner. In one embodiment, when data quality assertions are initially identified, the workflow owner may specify the remedial actions for each assertion. The alert system 170 notifies the workflow owner of the failure, and the remedial action taken.

Further details with regards to the operations of the data set analytics 150, metadata repository 160, and alert system 170 are described below.

Figure 2:
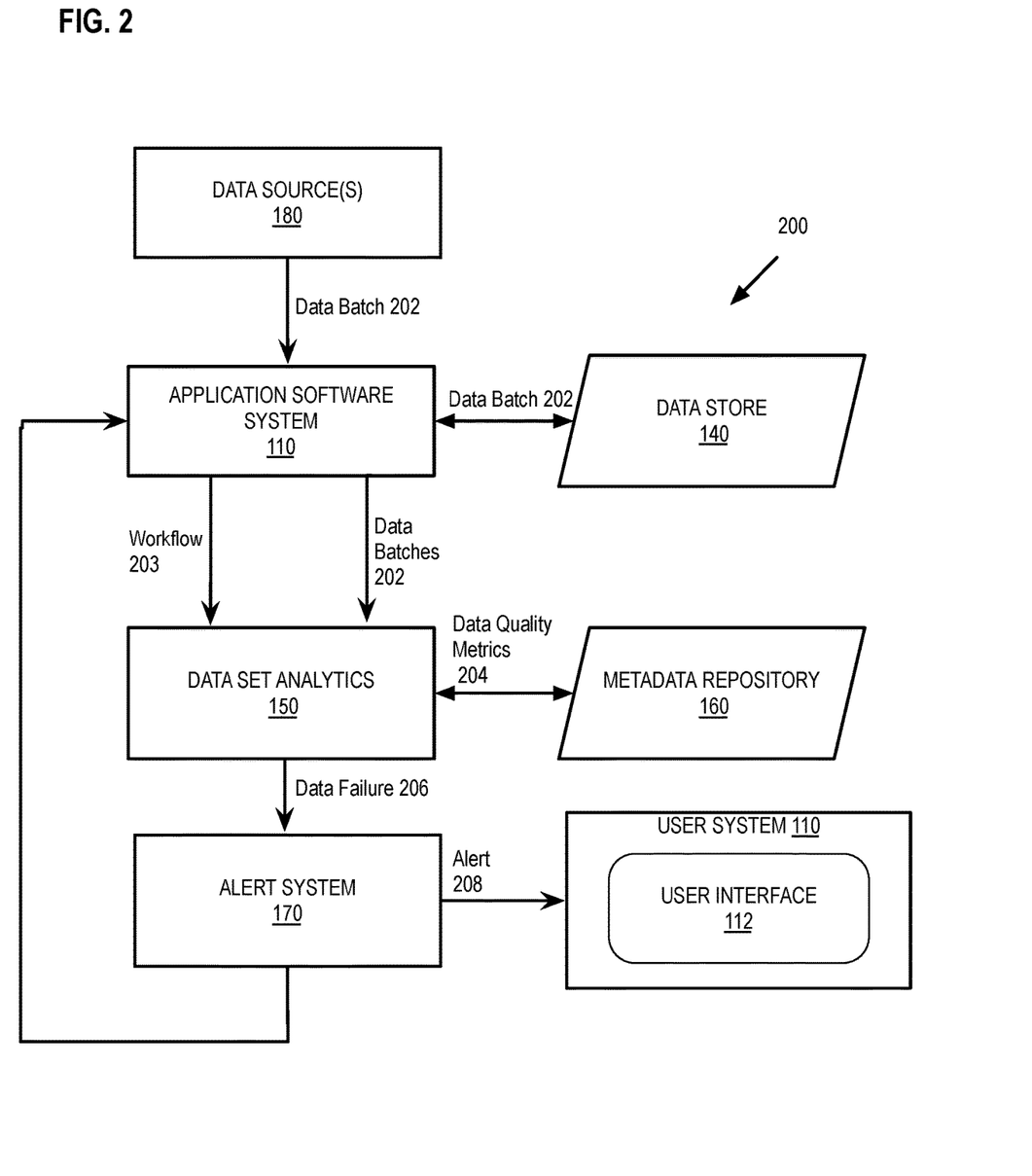
FIG. 2 is a flow diagram of an example method 200 to provide data set analytics in accordance with some embodiments of the present disclosure.

FIG. 2 is a data flow diagram of an example method 200 to provide data quality reasoning in accordance with some embodiments of the present disclosure. The data sources 180 can be any data source that provides data batches 202 to data store 140. In one embodiment, the data source 180 provides data batches 202 to application software system 110, to process the data batches into data store 140. The data batches 202 are additionally provided to the data set analytics 150.

The data set analytics 150 utilizes workflow 203 to identify the relevant data sets 202 for analysis, and then creates data quality assertions for each data set used by the workflow 230, based on the usage pattern of the data set by the workflow. The workflow 203 is analyzed to determine which data sets it uses, directly and indirectly. The data quality assertions in one embodiment identify the data characteristics, based on a metamodel which represents the predefined characteristics for a data set. A metamodel is a schema representing a collection of existing metrics, one or more of which apply to any data set. The metamodel language provides a formal language that enables semantic description of data health and data quality assertions. In one embodiment, the metamodel language is human readable, as well as computer parseable. The metamodel can be implemented using XML. In one embodiment, the metamodel provides a set of predefined characteristics that are collected for the data set, for example frequency, time of arrival, schema, etc. The metamodel may be extended with additional characteristics, based on business needs and/or the specifics of the data sets received. In one embodiment, the metamodel approach described in U.S. patent application Ser. No. 17/454,229, filed on Nov. 9, 2021, entitled "Automated Data Health Reasoning" is utilized. That application is incorporated herein by reference in its entirety.

The calculated values of these characteristics, in relation to the workflow, are used to formulate data quality metrics for the data set. Embodiments use the workflow data 203 to determine which subset of the predefined data characteristics applies to the data set. In one embodiment, the system uses a statistical analysis of multiple runs of the workflow to determine the data characteristics. In one embodiment, a machine learning system can be used to derive the data characteristics. Once these characteristics are identified, the system derives the data quality metrics for the data. In one embodiment, the system includes a set of predefined characteristics, defined by the metamodel, and compares the actual characteristics of the data batches received in the data set to those predefined characteristics. For example, a characteristic may be "time interval of use." The system determines when the data sets are used by the workflow.

The data quality metrics are the data characteristics that must be met by each data batch used by the workflow. The data quality metrics describe, for example, the data arrival frequency, size, and other characteristics of the data set.

These data quality metrics 240 are stored in metadata repository 160. In one embodiment, each of the predefined characteristics that is consistent for the data set can be considered as a candidate for a data quality metric. In one embodiment, the predefined characteristics include data format, data volume, data arrival frequency, and time of arrival for the data. In one embodiment, users may adjust the calculated data quality metrics for individual data sets and/or groups of data sets. Such additional data metrics may be added to the metamodel, and become predefined characteristics. There may be characteristics that vary among each use of the data set by the workflow. Those characteristics would not be used as data quality metrics. For example, if the workflow uses different numbers of data batches from a data set, that could not be used as a data metric.

The system monitors subsequent data batches of the data set to determine whether they meet the data quality metrics for the workflow. In one embodiment, before the workflow utilizes the data, the system verifies that the data set meets the data quality assertions. The measured data quality metrics 204 for the data batch are metadata that can be stored in metadata repository 160. When the data set analytics 150 indicates that a particular data batch does not meet the data quality metrics, via data failure indication 206, the alert system 170 can send an alert 208, via application software system 110. As will be described below, the systems that utilize the data can customize their preferred metrics for alerts 208.

The alert 208, can be used by data consuming applications and/or users to determine whether to use the data from data store 140. For example, for some uses, if the current data is missing (e.g., a data batch expected is not received) the user system may choose to exclude the data, or use a prior data batch in their processing. For some uses, the user workflow may delay the processing until the data becomes available. For example, if the current data batch has a different schema, this can make the data unusable for some systems. Thus, the user may choose to exclude the data from their processing, or verify that the schema change does not impact their use. Other options for addressing unavailable or unusable data can be chosen. However, by having this information, the user can affirmatively choose how to react. In this way, the system automatically generates and provides data quality information to users of the data simplifying data processing and reducing wasted processing of out-of-date data. In one embodiment, the workflow may include certain automatic remedial actions that may be taken when a particular data batch doesn't meet the data quality assertions. In one embodiment, the workflow may run and send alert 208 to indicate which remedial action(s) were taken.

Figure 3:
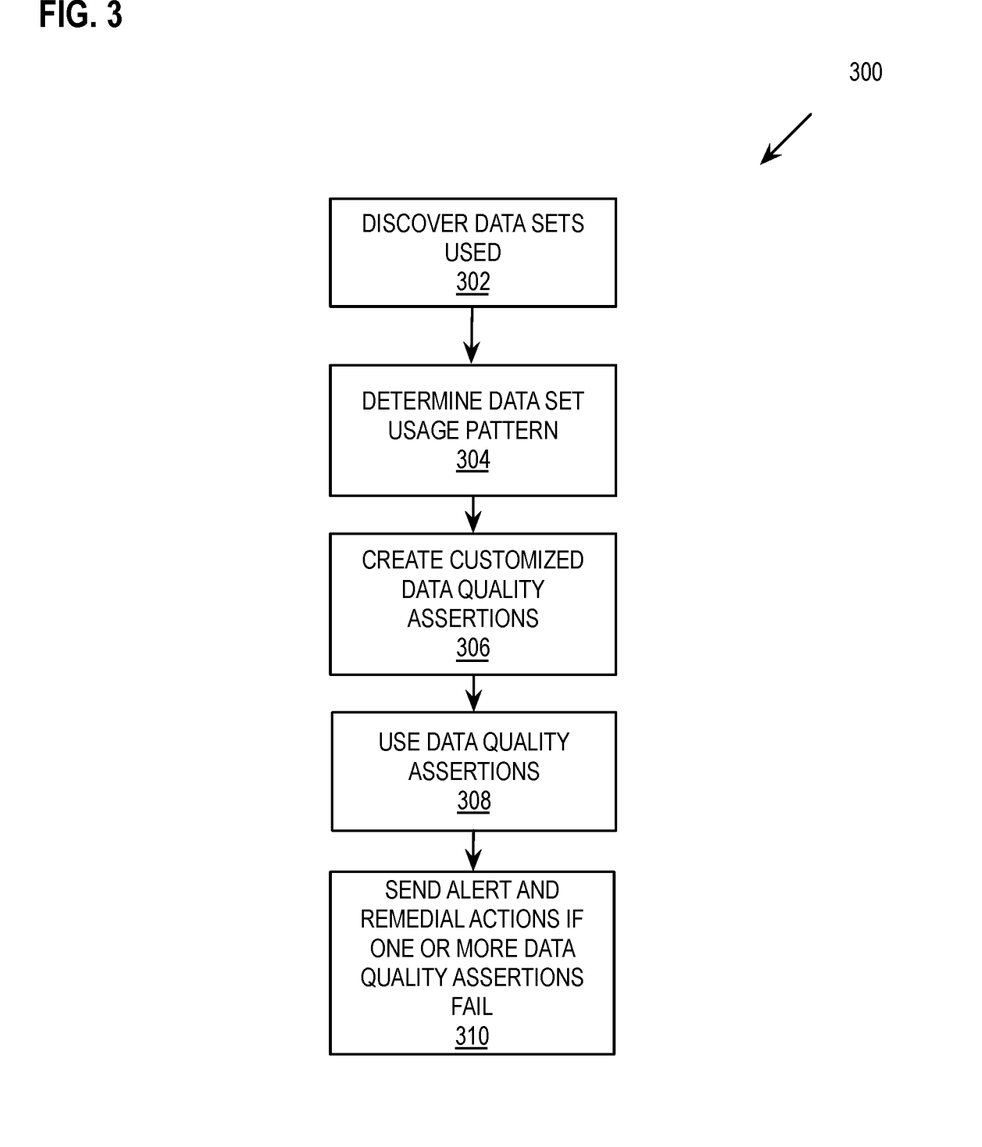
FIG. 3 is a flow diagram of an example method 300 to provide data set analytics in accordance with some embodiments of the present disclosure.

FIG. 3 is a flow diagram of an example method 300 to provide data quality reasoning in accordance with some embodiments of the present disclosure.

At operation 302, the data sets used by a workflow are identified. In one embodiment, the workflow logs are used to identify the data sets invoked by the workflow. The system further evaluates each of the data sets invoked by the workflow, to determine whether they utilize other data sets. The system recursively identifies each data set that is applicable to the workflow. These data sets are referred to as upstream data sets.

In one embodiment, the workflow may also invoke sub-workflows. In that case, the identification further includes examination of the relevant sub-workflows in determining the applicable data sets.

In one embodiment, the workflow is evaluated when it is initially established, and periodically thereafter, to determine which data sets are utilized by the workflow. In one embodiment, new data sets can be added to a workflow at any time. By utilizing this automatic analysis system, new data sets can be added to the workflow without setting up data quality assertions for the new data sets. The data analysis system collects and uses the metadata, and does not interfere with data in the data store.

At operation 304, data set usage patterns are determined. The usage patterns include the time and frequency at which a data batch is used by the workflow, for example. In one embodiment, the time of use is the first time a data batch is used by the workflow.

At operation 306, the system creates customized data quality assertions for the workflow. The customized data quality assertions in one embodiment correspond to the workflow specific usage patterns for the data sets. The customized data quality assertions verify that the data sets used by the workflow meet the workflow's requirements.

At operation 308, the customized data quality assertions are applied to data sets used by the workflow. The data set analytics automatically tests the new data batches against the data validation assertions. That is, the system determines whether the data sets used by the workflow, which includes data sets directly used as well as upstream data sets which are used by workflow, meets all of the data quality assertions for the workflow. In one embodiment, the data set analytics stores the result of the testing in the metadata repository as metadata associated with the data. In one embodiment, the data set analytics also updates the metadata associated with the data set, based on the data batch evaluation results. In one embodiment, the data set status indicates the results of the applied data validation assertions against the latest data batch.

At operation 310, the system sends an alert if one or more of the data validation assertions are not met by the data batch. The alert can be sent via a user interface. The alert can be an email. Other ways of providing the alert can be used. In one embodiment, the alert can be received by an automatic system that utilizes data. In one embodiment, the system may also take remedial action in response to determining that one or more data batches have failed the data quality assertions. The remedial actions may be to use a prior version of the data, to exclude the data from the workflow, or stop the workflow from execution, in one embodiment. In one embodiment, the remedial action taken may be set by the workflow owner. In one embodiment, if no remedial action is selected by the workflow owner, the system by default stops the execution of the workflow and sends an alert to the workflow user.

This method 300 is used continuously as workflows are executed. In one embodiment, the method 300 is run each time prior to a workflow being used. In another embodiment, the method 300 is periodically re-initiated for existing workflows. The method 300 monitors the data sets used by the workflow. In one embodiment, the system can notify the method 300 that a new data set has been added to a workflow, and trigger the reevaluation of the workflow. For existing workflows, the method 300 utilizes operations 308 and 310.

The methods described above can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the methods above are performed by the data set analysis component 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 4:
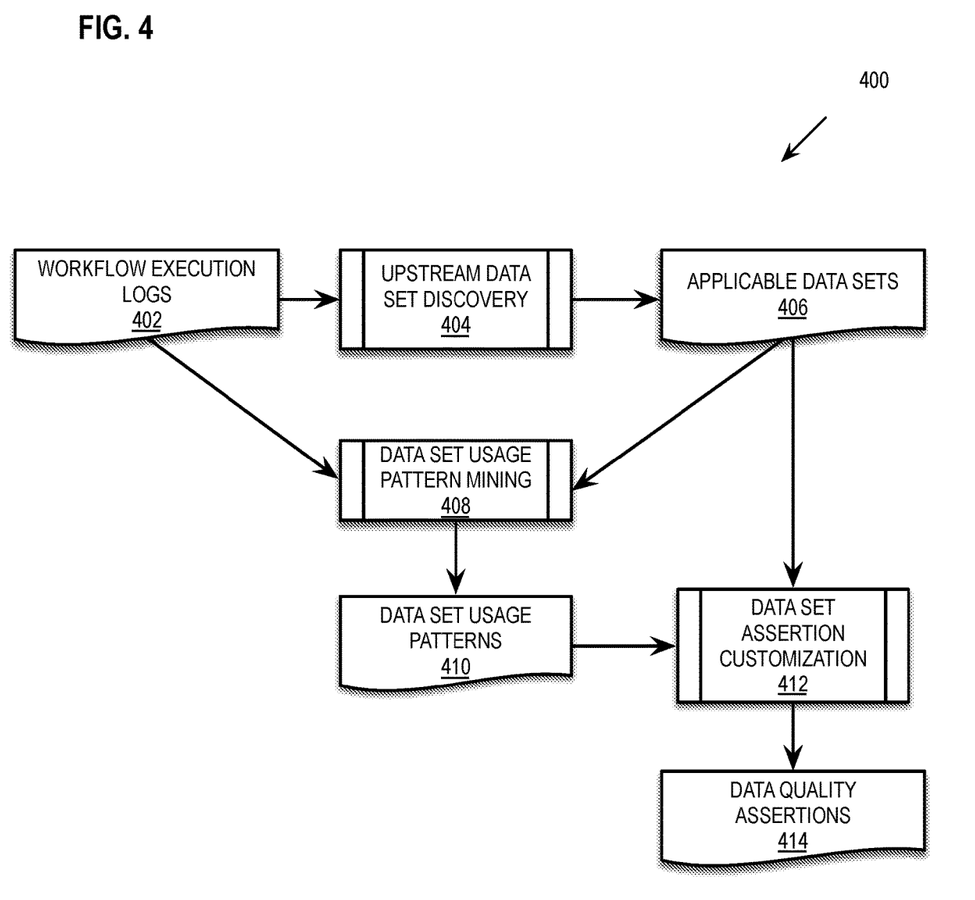
FIG. 4 is a flow diagram of an example method 400 to create data set assertions in accordance with some embodiments of the present disclosure.

FIG. 4 is a flow diagram of an example method 400 to create data quality assertions for alerting in accordance with some embodiments of the present disclosure. The workflow execution logs 402 are the logs of the execution logic that accesses input data sets, to produce an output. An exemplary workflow may be the workflow used to generate a "people you may know" recommendation, in an online network application. The workflow execution logic 402 includes data about each of the data sets accessed by the workflow, and the exact timing, and data content utilized by the workflow. The workflow execution logs 402 represent the ground truth on which datasets are read from and written to by the workflow during the runtime execution—they are more accurate than declarative information which may become obsolete over time without proper and constant maintenance.

The workflow execution logic 402 is used by the upstream data set discovery 404. The upstream data set discovery 404 parses the logs to identify data set inputs and outputs (I/O). The applicable data sets 406 identifies the data sets extracted by the upstream data set discovery 404. The applicable data sets 406 in one embodiment is a list of data sets which are directly, or indirectly, used by the workflow.

For example, in one embodiment, a workflow dataset may have the format:

datasetIOLog (flowName, flowExecutionId, IOoperation, datasetName, timestamp)
That may look as follows:
('Jobs', 12345, 'read', 'Jobs_postings', '2022-04-10 00:01:45')

This indicates that the workflow named "Jobs" with the execution ID "12345" read the data set "Jobs postings" at a particular date and time.
However, that data set "Jobs_postings" may have other data sets which are related to it. For example, the following information may be in the log of the workflow that generates the data set Jobs_postings:

('Jobs_creation', 54321, 'write', 'Jobs_postings', '2022-04-09 00:01:45')

This indicates that the workflow named "Jobs creation" with the execution ID "54321" wrote to the dataset "Jobs postings" at a particular date and time.

One implementation of finding the first "hop" of upstream data sets for a given workflow may be implemented as:

```
Select      distinct datasetName
From        datasetIOLog
Where       IOperation = 'read' and flowName = 'f'
            and datasetName not in {
            Select datasetName
            From datasetIOLog
            Where IOoperation = 'write'
```

The upstream data set discovery 404 recursively searches one hop upstream data sets, to discover all of the applicable data sets 406 used by the workflow, as identified in the workflow execution logs 402. In one embodiment, the search extends for N iterations. In one embodiment, the number of iterations may be set. In one embodiment, the system may iterate until no further upstream data sets that had not previously been identified are found.

The dataset usage pattern mining 408 utilizes the workflow execution logs 402 and applicable data sets 406 to identify best fit default assertions for each of the applicable data sets. In one embodiment, the best fit assertions include read frequency and read time. In one embodiment, best fit assertions may also include the number of data batches in the data set, the schema of the data set, and other characteristics.

The data set usage pattern mining 408 determines how the data is used. For timing, in one embodiment, for a given input dataset d and workflow f, the reading operation can form a time series:

T (timestamp1, timestamp2, . . . , timestamp n)
2022-03-10 00:01:45, 2022-03-11 00:02:05, 2022-03-12 00:02:00,
2022-03-13 00:02:02, 2022-03-14 00:01:55, 2022-03-15 00:02:05,
2022-03-16 00:02:02, 2022-03-17 00:02:01, 2022-03-18 00:02:05,
2022-03-19 00:02:05, . . .

An example of time series can be
From the time series, the system can discover how frequently the workflow reads the dataset and what is expected time when the workflow starts to read the dataset each time. To infer the read frequency, the time series T can be transformed into a new time series:

D (timestamp2-timestamp1, timestamp3-timestamp4, . . . , timestamp-n - timestamp-n-1)

This time series D indicates intervals between two consecutive reads for a given workflow. The reciprocal of such intervals is the inferred read frequency.

To infer the expected arrival time, time series T can be transformed to a new time series:
H(hour_minute1,hour_minute2, . . . , hour_minuten)
This time series H indicates the hour/minute of each read operation from a workflow, which can be used to infer expected reading time.

The data set usage pattern mining 408 thus determines the relevant characteristics of each of the applicable data sets 406 for this particular workflow. With the read frequency and expected reading time, the default data availability assertions for each upstream dataset can be established without manual intervention. The default assertions are established based on how the datasets are read and are relevant to the consuming workflow.

The data set usage patterns 410 are used to generate the default data set assertions.

The data set assertion customization 412 allows the user of the workflow to customize the automatically generated data quality assertions. The customization may adjust the alert format and content as well, in one embodiment.

The output of the system are the data set quality assertions 414, which are used by the alert system to indicate to the user of the workflow when one or more of the applicable data sets do not meet the data set quality assertions 414. In one embodiment, this process may be run daily. In another embodiment, this process may be run each time the workflow is initiated. In another embodiment, this process may be run each time the workflow is edited in any way. In another embodiment, this process may be run each time any of the applicable data sets is changed.

Figure 5:
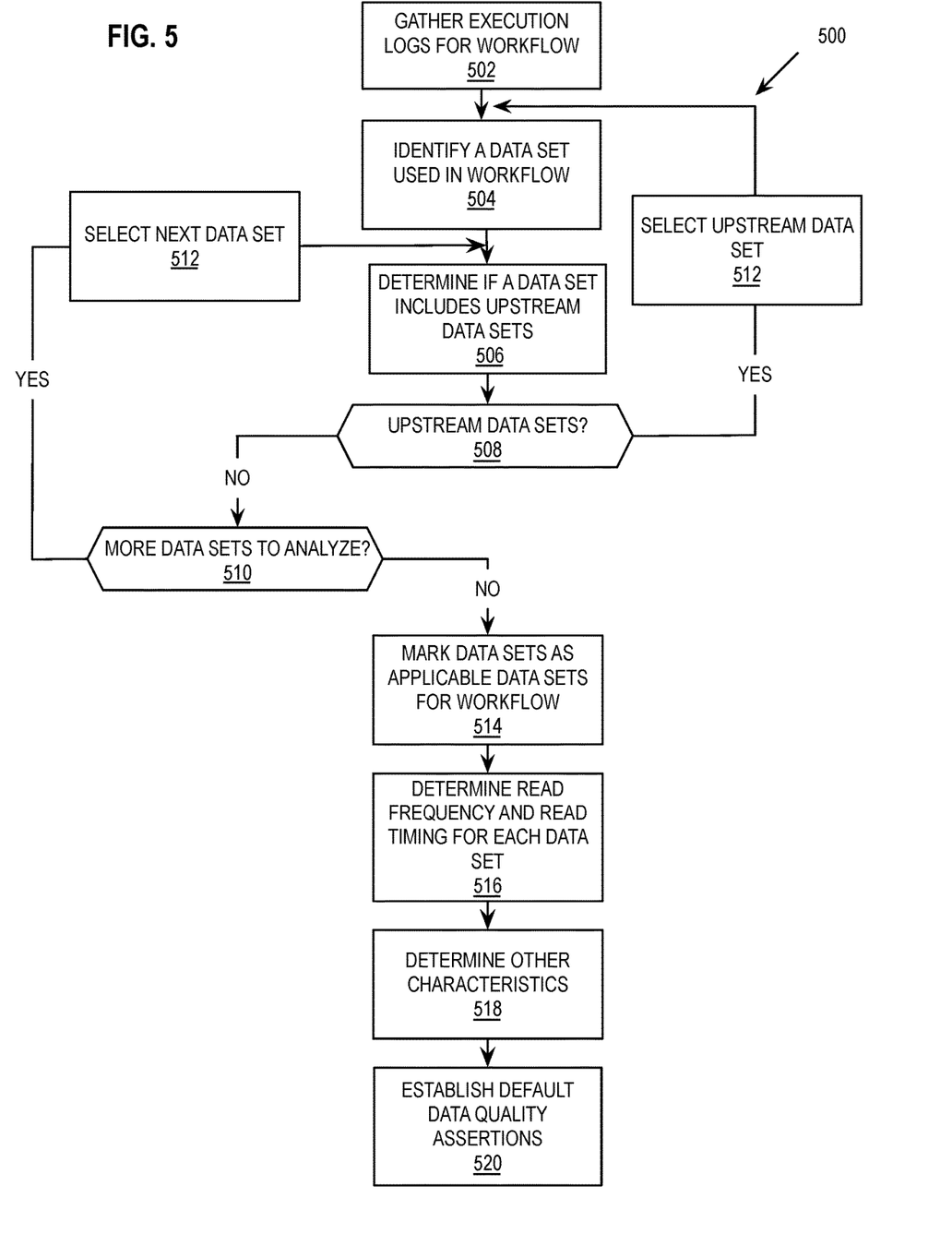
FIG. 5 is a flow diagram of an example method 500 to establish default data availability assertions in accordance with some embodiments of the present disclosure.

FIG. 5 is a flow diagram of an example method 500 to establish default data availability assertions in accordance with some embodiments of the present disclosure.

At operation 502, the execution logs for the workflow are gathered. The execution logs provide information about all data sets which are read from and written to by the workflow during execution.

At operation 504, the data sets used in the workflow are identified. The data sets used in the workflow are those that the workflow reads from.

At operation 506, for an identified data set, the system determines whether there are any upstream data sets. An upstream data set is a data set which writes to the identified data set, and/or from which the identified data set reads data. In one embodiment, for the identified data set, the system may determine whether the data set has been previously analyzed, for a different workflow, or for this workflow. If so, the upstream data sets associated with the identified data set may be obtained from the prior analysis, rather than performing the iterative operation of identifying upstream data sets.

If there are upstream data sets, as determined at operation 508, the process returns to operation 504 to select one of the upstream data sets, and determine whether it has any further upstream data sets. In one embodiment, this recursive process is iterated until all data sets relevant to the workflow are identified. Thus, the set of applicable data sets includes all data sets directly utilized by the workflow, and all upstream data sets that are used by those data sets.

If there are no further upstream data sets, as determined at operation 508, at operation 510 the system determines whether there are more data sets to analyze. A single workflow can include dozens of data sets, each of which is analyzed in this way. If there are more data sets to analyze, operation 512 selects the next data set for analysis, and the process returns to operation 506 to evaluate the newly selected data set.

If there are no further data sets to analyze, as determined at operation 510, at operation 514, the data sets are marked for the workflow. This collection of data sets is referred to as the applicable data sets. Thus, the applicable data sets include the data sets directly referenced by the workflow as well as the upstream data sets that are identified in the recursive search.

At operation 516, a read frequency and read timing is determined for each data set. As discussed above, this determination is based on the analysis of the execution logs over multiple executions of the workflow, in one embodiment.

At operation 518, other characteristics that are monitored for the data set are identified. Those characteristics may include for example the number of available data batches in the data set. Those characteristics may include the format, schema, and/or size of the data batches in the data set. Other characteristics that may be identified from analyzing the data sets may also be utilized.

At operation 520, the default data quality assertions are established for this workflow. These default data quality assertions may include the read frequency, read timing, and/or other characteristics for each of the applicable data sets associated with the workflow. In one embodiment, this information is stored in a metadata repository. In one embodiment, the information is associated with the workflow. In another embodiment, this data may not be stored, but rather applied immediately to the data sets for an upcoming utilization of the workflow.

The methods described above can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the methods above are performed by the data set analysis component 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 6:
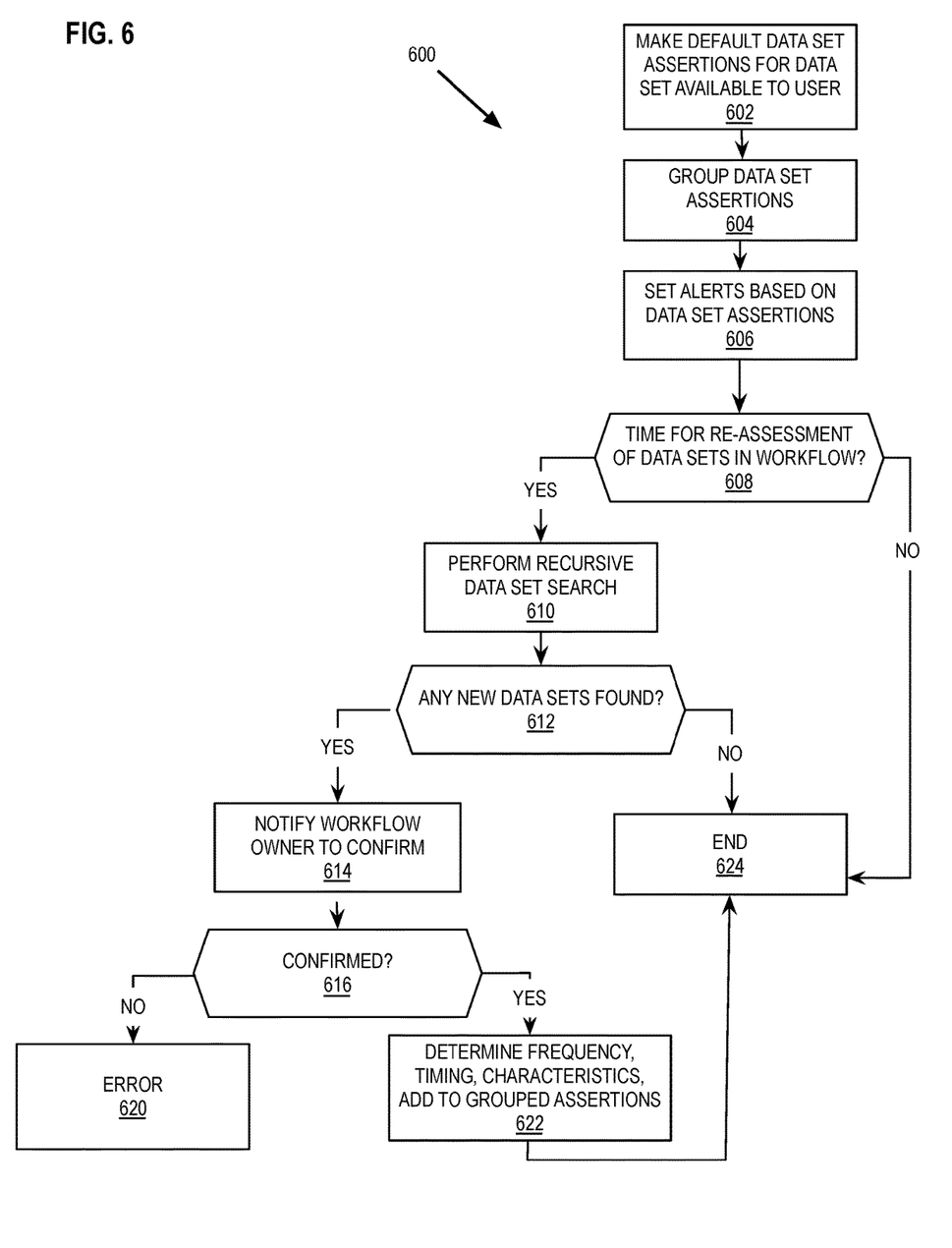
FIG. 6 is a flow diagram of an example method 600 to maintain the data set assertions in accordance with some embodiments of the present disclosure.

FIG. 6 is a flow diagram of an example method 600 to maintain the data set assertions in accordance with some embodiments of the present disclosure. In one embodiment, this method 600 follows the method described above with respect to FIG. 5.

At operation 602 the default data set assertions for the data set are made available to the workflow user. Although the term "user" is utilized, the user in this context may include one or more users, administrators, or others that utilize the workflow. In some embodiments, when multiple users access the same workflow, they may customize the notifications on a per-user basis. In one embodiment, each workflow has an owner, and only the owner can make changes.

At operation 604, the data set assertions are grouped. In one embodiment, the assertions are grouped based on the timing of the data set usage.

At operation 606, the alerts are set based on the data set assertions. As noted above, in one embodiment, the user and/or owner can customize the alerts. In one embodiment, the customization may include the alert format, content, and frequency. In one embodiment, the user may also turn off some alerts.

At operation 608, the process determines whether it is time for a re-assessment of the data sets utilized by the workflow. In one embodiment, the workflow is reassessed before each time it is run. In another embodiment, the workflow is reassessed each time it is updated. In another embodiment, the workflow is reassessed periodically. If the workflow does not need to be reassessed, the process ends. Otherwise, the process continues to operation 610.

At operation 610, the recursive data set search is performed. This is described in connection with FIG. 5 above.

At operation 612, the method determines whether any new data sets were identified. If no new data sets were identified, the method ends. Otherwise, at operation 614, the workflow owner is notified, to confirm the addition of the new data set.

If the data set is not confirmed, an error is generated, at operation 620. This may occur when this data set is no longer being utilized by the workflow. In one embodiment, the data set is removed from monitoring, if it is not confirmed.

If the data set is confirmed, at operation 622, the frequency and timing, and other characteristics are determined. The data set is then added to the grouped assertion, and alerts are set or updated based on the updated data sets. The method then ends.

Figure 7:
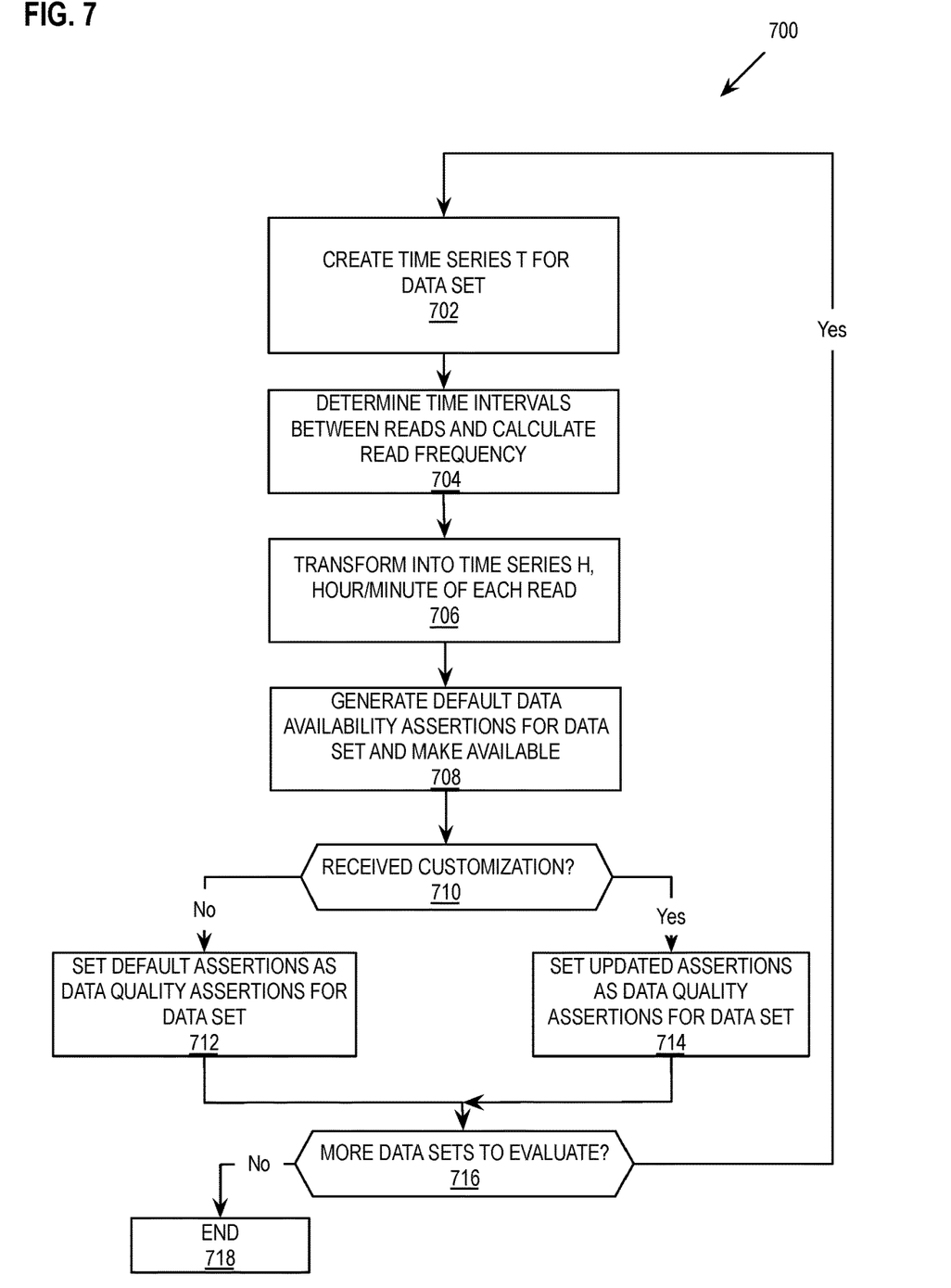
FIG. 7 is a flow diagram of an example method 700 to create data set assertions in accordance with some embodiments of the present disclosure.

FIG. 7 is a flow diagram of an example method 700 to create data set assertions in accordance with some embodiments of the present disclosure. In one embodiment, this corresponds to operation 516 of FIG. 5.

At operation 702, a time series T is created for the data set. The time series includes the time stamps for each reading of the data set by the workflow. In one embodiment, the time stamps include a date and time.

At operation 704, the time intervals between the reads are determined. The time intervals are determined based on the differences between time adjacent time stamps. The reciprocal of the interval is the read frequency.

At operation 706, the time series is transformed into the hour/minute time of each read operation from a workflow. This is used to infer the expected time when the data set will be accessed by the workflow. In one embodiment, the average of the time series is used as the expected reading time. In another embodiment, the earliest reading time in the time series is used as the expected reading time.

At operation 708, the default data availability assertions are generated for the data set. The data availability assertions include the reading time and read frequency for the data set. These assertions are made available to the user and/or owner of the workflow.

At operation 710, the method determines whether the user/owner customized the data availability assertions. If no customization is received, at operation 712, the default assertions are set as the data quality assertions for the data set. As discussed above, in addition to the data availability, the full set of data quality assertions may also include other characteristics of the data set. If customization is received, at operation 714, updated assertions are generated, and set as the data quality assertions for the data set. The method then determines whether there are more sets to evaluate. If so, the method returns to operation 702, to perform the method for the next data set. Otherwise, the process ends.

FIG. 8 illustrates an example machine of a computer system 800 within which a set of instructions, for causing the machine to perform any one or more of the methodologies discussed herein, can be executed. In some embodiments, the computer system 800 can correspond to a component of a networked computer system (e.g., the computer system 100 of FIG. 1) that includes, is coupled to, or utilizes a machine to execute an operating system to perform operations corresponding to the data set analytics 150 of FIG. 1.

Data set analytics 150, metadata repository 160, and alert system 170 are shown as part of instructions 812 to illustrate that at times, portions of data set analytics 150, metadata repository 160, and/or alert system 170 are executed by processing device 802. However, it is not required that data set analytics 150, metadata repository 160, and/or alert system 170 be included in instructions 812 at the same time and any portions of data set analytics 150, metadata repository 160, and/or alert system 170 are stored in other components of computer system 800 at other times, e.g., when not executed by processing device 802.

The machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random-access memory (DRAM) such as synchronous DRAM (SDRAM) or Rambus DRAM (RDRAM), etc.), a memory 806 (e.g., flash memory, static random-access memory (SRAM), etc.), an input/output system 'Z10, and a data storage system 840, which communicate with each other via a bus 830.

Data set analytics 150, metadata repository 160, and/or alert system 170 are shown as part of instructions 814 to illustrate that at times, data set analytics 150, metadata repository 160, and/or alert system 170 can be stored in main memory 804. However, it is not required that data set analytics 150, metadata repository 160, and/or alert system 170 be included in instructions 814 at the same time and any portions of data set analytics 150, metadata repository 160, and/or alert system 170 can be stored in other components of computer system 800.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 812 for performing the operations and steps discussed herein.

The computer system 800 can further include a network interface device 808 to communicate over the network 820. Network interface device 808 can provide a two-way data communication coupling to a network. For example, network interface device 808 can be an integrated-services digital network (ISDN) card, cable modem, satellite modem, or a modem to provide a data communication connection to a corresponding type of telephone line. As another example, network interface device 808 can be a local area network (LAN) card to provide a data communication connection to a compatible LAN. Wireless links can also be implemented. In any such implementation network interface device 808 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 800.

Computer system 800 can send messages and receive data, including program code, through the network(s) and network interface device 808. In the Internet example, a server can transmit a requested code for an application program through the Internet 628 and network interface device 808. The received code can be executed by processing device 802 as it is received, and/or stored in data storage system 840, or other non-volatile storage for later execution.

Data set analytics 150, metadata repository 160, and/or alert system 170 are shown as part of instructions 844 to illustrate that at times, portions of data set analytics 150, metadata repository 160, and/or alert system 170 can be stored in data storage system 840. However, it is not required that data set analytics 150, metadata repository 160, and/or alert system 170 be included in instructions 844 at the same time and any portions of data set analytics 150, metadata repository 160, and/or alert system 170 can be stored in other components of computer system 800.

The input/output system 810 can include an output device, such as a display, for example a liquid crystal display (LCD) or a touchscreen display, for displaying information to a computer user, or a speaker, a haptic device, or another form of output device. The input/output system 810 can include an input device, for example, alphanumeric keys and other keys configured for communicating information and command selections to processing device 802. An input device can, alternatively or in addition, include a cursor control, such as a mouse, a trackball, or cursor direction keys for communicating direction information and command selections to processing device 802 and for controlling cursor movement on a display. An input device can, alternatively or in addition, include a microphone, a sensor, or an array of sensors, for communicating sensed information to processing device 802. Sensed information can include voice commands, audio signals, geographic location information, and/or digital imagery, for example.

The data storage system 840 can include a machine-readable storage medium 842 (also known as a computer-readable medium) on which is stored one or more sets of instructions 844 or software embodying any one or more of the methodologies or functions described herein. The instructions 812, 814, 844 can also reside, completely or at least partially, within the main memory 804 and/or within the processing device 802 during execution thereof by the computer system 800, the main memory 804 and the processing device 802 also constituting machine-readable storage media.

In one embodiment, the instructions 826 include instructions to implement functionality corresponding to data set analytics (e.g., the data set analytics component 150 of FIG. 1). While the machine-readable storage medium 842 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented method of generating data validation assertions and verifying that data batches meet these data validation assertions, in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving an execution log of a workflow, the execution log recording each data set read from or written to by the workflow during runtime execution;
analyzing the execution log of the workflow to identify one or more heterogeneous data sets used by the workflow;
identifying upstream data sets for each of the one or more heterogeneous data sets used by the workflow, the one or more heterogeneous data sets and the upstream data sets comprising a set of applicable data sets for the workflow;
for each data set in the applicable data sets, determining a usage pattern of the data set by the workflow, the usage pattern defining a read frequency and read time for the data set;
deriving one or more data quality assertions for each of the applicable data sets based on the usage pattern; and
evaluating a data quality for the applicable data sets by applying data quality assertions to the applicable data sets used by the workflow.

2. The method of claim 1, wherein the data quality assertions define an availability timing of data batches in the data set.

3. The method of claim 1, further comprising:
sending an alert to a user of a particular workflow when one or more of the applicable data sets does not meet one of the one or more data quality assertions for the particular workflow.

4. The method of claim 1, wherein the data quality assertions define a number of data batches in a data set.

5. The method of claim 1, wherein the data quality assertions define a size of a data batch in the data set.

6. The method of claim 1, further comprising:
for each associated upstream data set, recursively identifying associated upstream data sets.

7. The method of claim 1, wherein identifying one or more data quality assertions comprises, for a selected data set:
determining a read frequency of the selected data set;
determining read timing for the selected data set; and
identifying the data quality assertion, based on the read frequency and the read timing for the data set.

8. The method of claim 7, wherein determining the read frequency comprises:
identifying times when the workflow reads the selected data set for a plurality of sequential executions of the workflow;
generating a time series based on the times;
calculating intervals between the times in the time series; and
determining the read frequency based on a reciprocal of the intervals.

9. The method of claim 1, wherein identifying one or more data quality assertions comprises, for a selected data set:
determining a number of data batches used by the workflow for a plurality of executions of the workflow; and
identifying a data content assertion, based on the number of data batches, the data content assertion comprising the data quality assertion.

10. The method of claim 1, wherein identifying one or more data quality assertions comprises, for a selected data set:
determining a data format for the selected data set used by the workflow for a plurality of executions of the workflow; and
identifying a data format assertion, based on a number of data batches, the data format assertion comprising the data quality assertion.

11. A system comprising:
a memory to store a plurality of heterogeneous data sets;
data set analytics to analyze an execution log of a workflow to identify one or more of the heterogeneous data sets used by the workflow;
the data set analytics further to identify upstream data sets for each of the one or more heterogeneous data sets used by the workflow, the one or more heterogeneous data sets and the upstream data sets comprising a set of applicable data sets for the workflow;
for each data set in the applicable data sets, the data set analytics further to determine a usage pattern of the data set by the workflow, the usage pattern defining a read frequency and read time for the data set;
the data set analytics generating one or more data quality assertions for each of the applicable data sets based on the usage pattern; and
the data set analytics evaluating a data quality for the applicable data sets by applying data quality assertions to the applicable data sets used by the workflow.

12. The system of claim 11, wherein the data quality assertions define an availability timing of data batches in the data set.

13. The system of claim 11, further comprising:
an alert system to send an alert when one or more of the applicable data sets does not meet one of the one or more of the data quality assertions.

14. The system of claim 11, wherein the data quality assertions define one of a number of data batches in a data set and a size of a data batch in the data set.

15. The system of claim 11, further comprising:
the data set analytics further to recursively identifying associated upstream data sets for each identified associated upstream data set.

16. The system of claim 11, wherein identifying one or more data quality assertions comprises, for a selected data set, the data set analytics further to:

determine a read frequency of the selected data set;
determine read timing for the selected data set; and
identify the data quality assertion, based on the read frequency and the read timing for the data set.

17. The system of claim 16, wherein the data set analytics determining the read frequency comprises:
identifying times when the workflow reads the selected data set for a plurality of sequential executions of the workflow;
generating a time series based on the times;
calculating intervals between the times in the time series; and
determining the read frequency based on a reciprocal of the intervals.

18. The system of claim 11, wherein the data set analytics identifying one or more data quality assertions comprises, for a selected data set:
determining a number of data batches used by the workflow for a plurality of executions of the workflow; and
identifying a data content assertion, based on the number of data batches, the data content assertion comprising the data quality assertion.

19. The system of claim 11, wherein identifying one or more data quality assertions comprises, for a selected data set:
determining a data format for the selected data set used by the workflow for a plurality of executions of the workflow; and
identifying a data format assertion, based on a number of data batches, the data format assertion comprising the data quality assertion.

20. A non-transitory computer readable storage medium storing one or more programs for execution by one or more processors, the one or more programs comprising instructions for:
receiving an execution log of a workflow, the execution log recording each data set read from or written to by the workflow during runtime execution;
analyzing the execution log of the workflow to identify one or more heterogeneous data sets used by a workflow;
identifying upstream data sets for each of the one or more heterogeneous data sets used by the workflow, the one or more heterogeneous data sets and the upstream data sets comprising a set of applicable data sets for the workflow;
for each data set in the applicable data sets, determining a usage pattern of the data set by the workflow the usage pattern defining a read frequency and read time for the data set;
generating one or more data quality assertions for each of the applicable data sets based on the usage pattern; and
evaluating a data quality for the applicable data sets by applying data quality assertions to the applicable data sets used by the workflow.

* * * * *